(12) United States Patent  
Sankrithi et al.

(10) Patent No.: US 7,900,868 B2  
(45) Date of Patent: Mar. 8, 2011

(54) NOISE-SHIELDING WING CONFIGURATION

(75) Inventors: Mithra M. K. V. Sankrithi, Lake Forest Park, WA (US); David J. Paisley, Kent, WA (US); Matthew D. Moore, Everett, WA (US)

(73) Assignee: The Boeing Company, Chicago, IL (US)

( * ) Notice: Subject to any disclaimer, the term of this patent is extended or adjusted under 35 U.S.C. 154(b) by 865 days.

(21) Appl. No.: 11/845,492

(22) Filed: Aug. 27, 2007

(65) Prior Publication Data

US 2009/0057493 A1    Mar. 5, 2009

(51) Int. Cl.  
*B64C 39/00*    (2006.01)

(52) U.S. Cl. .............................. 244/10; 244/1 N; 244/55

(58) Field of Classification Search .................. 244/4 R, 244/34 R, 35 R, 36, 45 R, 45 A, 55, 1 N; D12/319, 331, 332, 333, 334, 335, 341  
See application file for complete search history.

(56) References Cited

U.S. PATENT DOCUMENTS

| | | | | |
|---|---|---|---|---|
| 3,576,300 | A | | 4/1971 | Palfreyman |
| 3,869,102 | A | * | 3/1975 | Carroll .............................. 244/36 |
| 4,019,699 | A | | 4/1977 | Wintersdorff et al. |
| 4,036,452 | A | | 7/1977 | Schairer |
| 4,311,289 | A | * | 1/1982 | Finch .............................. 244/55 |
| 4,447,022 | A | * | 5/1984 | Lion ................................ 244/13 |
| 4,469,294 | A | * | 9/1984 | Clifton .......................... 244/12.3 |
| 4,614,320 | A | * | 9/1986 | Rutan ............................. 244/216 |
| 5,850,990 | A | * | 12/1998 | Gevers ........................... 244/105 |
| 2007/0176047 | A1 | * | 8/2007 | Moore et al. .................... 244/54 |

OTHER PUBLICATIONS

Patent Application Not Yet Published, U.S. Appl. No. 11/612,594, filed Dec. 19, 2006.  
Design Patent Application, U.S. Appl. No. 29/247,058, filed May 26, 2006.

* cited by examiner

*Primary Examiner* — Timothy D Collins  
*Assistant Examiner* — Justin Benedik  
(74) *Attorney, Agent, or Firm* — Charles L. Moore; Christopher W. McAvoy; Moore & Van Allen, PLLC

(57) ABSTRACT

Embodiments of the invention provide an aircraft configuration that provides for increased engine noise shielding for community noise reduction, while still providing desirable aerodynamic attributes such as good spanwise lift distributions and good structural integration without excessive wing surface area. Specifically, the aircraft is configured to have a longer-chord inboard wing portion and a shorter-chord outboard wing portion. The aircraft engines are positioned in major part over the longer-chord inboard wing portions such that communities below the wing are at least partially shielded by the inboard wing portion from the engine noise. Embodiments of the invention also strategically position fowler flaps or other chord-increasing devices in the region of the wing proximate the engine. Since the fowler motion increases the effective chord of the wing as the flaps are extended, the flaps may be deployed to increase the shielding characteristics of the wing.

23 Claims, 15 Drawing Sheets

NOISE-SHIELDING WING CONFIGURATION

FIELD

This invention relates to the field of aircraft design, and more particularly embodiments of the invention relate generally to an aircraft having a wing specifically configured to shield engine noise from surrounding communities.

BACKGROUND

Aircraft engines generate significant sound during operation. Excessive engine sound is generally undesirable since excessive sound may disturb surrounding communities.

Conventional subsonic civil aircraft designs commonly feature engines placed underneath the aircraft's wings. The sound pressure level produced by the engines, herein generally referred to as "engine noise," and particularly the engine noise generated during takeoff and landing, travels largely unabated to surrounding communities. For under-wing engine installations this noise is amplified by the lower surface of the wing because the portion of the sound produced by the engines that would otherwise radiate upward is reflected downward off of the lower surface of the wing. Furthermore, the engine exhaust plume may interact with the wing's trailing edge, especially during landing and/or takeoff when trailing-edge flaps may be extended further into the engine exhaust plume. Both the lower wing surface reflection and the engine exhaust plume interaction with the wing's trailing edge add to the overall noise heard below the aircraft.

Further exasperating the community noise problem, transportation and traffic planners frequently call for increased dependence on regional passenger air transportation to serve smaller regional airports that surround major international airport hubs. Regional air transportation creates an increased risk of community environment intrusion since regional air transportation operations are often confined within lower speed regimes that result in longer exposure times at lower altitude ceilings and in closer proximity to surrounding communities. Furthermore, the surrounding communities have become increasingly sensitive to extended exposures to aircraft noise.

Many approaches to reducing community noise primarily focus on the propulsion system itself and the design of the engine nacelle. For example, many attempts to reduce engine noise have resulted in higher bypass ratio turbofan engines, the use of negatively scarfed inlets, and the use of chevrons. While technological improvements in engines have resulted in a gradual reduction of engine noise over time, further reductions in the amount of engine noise reaching surrounding communities are desired.

A few examples exist that purposefully exploit engine installation as a primary noise reduction feature. In particular, in a small number of cases engines have been installed above the wings to yield some reduction in downward, forward, and/or sideline emanating noise via the principle of shielding. For example, U.S. patent application Ser. Nos. 11/307,271, 11/612,594, and 29/247,058 assigned to The Boeing Company describe aircraft configurations where the engine is positioned above the wing. Other examples of aircraft having engines positioned higher than the wing (in many cases for reasons other than noise) include the VFW-614, the Honda Jet, the Beriev Be-200, the Boeing 717, and the family of Gulfstream business jets. However, even when engines are located higher than the wings, these aircraft do not have wing planforms tailored specifically to impede the downward travel of sound due to the absence of a tailored planform surface that covers a substantial area of the downward sound propagation path. Furthermore, merely placing the engine above the wing to increase the amount of effective acoustic shielding typically also results in corresponding increases in induced drag, interference drag, and skin friction or parasite drag scaling with wetted area. Therefore, systems and methods are needed for reducing the engine noise directed toward surrounding communities without significantly impacting the aircraft's lift and drag characteristics in a negative way.

Furthermore, while "flying wing" type aircraft often are configured with the engines above the wing/fuselage portion of the flying wing, systems and methods are needed for reducing the engine community noise on a more conventional type of aircraft where two generally high aspect ratio main wings are coupled to the fuselage and where the horizontal stabilizer is separate and distinct from the two main wings.

BRIEF SUMMARY

Embodiments of the present invention address the above needs and/or achieve other advantages by providing an improved aircraft configuration that yields added benefits by providing increased engine noise shielding for community noise reduction, while still providing desirable aerodynamic attributes such as good spanwise lift distributions and good structural integration without excessive wing surface area. Embodiments of the invention also strategically position fowler flaps or other chord-increasing devices in the region of the wing proximate the engine. For example, the fowler motion increases the effective chord as the flaps are extended, thereby increasing the acoustic barrier and the shielding of the engine noise from surrounding communities.

More particularly, embodiments of the invention provide an aircraft having a generally tubular fuselage and first and second wings mounted to the generally tubular fuselage and configured for aerodynamically supporting the aircraft during flight. The first and second wings each generally have at least two distinct wing portions including a shorter chord outboard wing portion and a longer chord inboard wing portion. The shorter chord outboard wing portion has an average chord length that is generally less than the average chord length of the longer chord inboard wing portion. Furthermore, the longer chord inboard wing portion generally has a minimum chord length that is greater than the maximum chord length of the shorter chord outboard wing portion. The aircraft also has a horizontal stabilizer mounted to the generally tubular fuselage, the horizontal stabilizer being separate and distinct from the first and second wings. The aircraft's engine is positioned in major part over the longer chord inboard wing portion of at least one of the first and second wings so that an area below the aircraft is at least partially shielded from the sound of the engine by the longer chord inboard wing portion.

In some embodiments of the aircraft described above, the average lift coefficient of the inboard wing portion's airfoils at a representative cruise angle of attack (typically a low angle of attach such as a negative-one, zero, one, two, or three degree angle of attack) is less than the average lift coefficient of the outboard wing portion's airfoils at its corresponding cruise angle of attack. Similarly, the wing lift coefficient of the inboard wing portion at a representative cruise angle of attack and with zero deflection of any moveable lift altering devices is generally less than the wing lift coefficient of the outboard wing portion at a representative cruise angle of attack and with zero deflection of any moveable lift altering devices. In a preferred embodiment, the chord length of the airfoil at the outboard end of the inboard wing portion is greater than the chord length of the airfoil at the inboard end of the outboard wing portion, and the lift coefficient of the airfoil at the outboard end of the inboard wing portion is less than the lift coefficient of the airfoil at the inboard end of the outboard wing portion.

In some embodiments, the aircraft is configured such that there is a substantially smooth transition in lift distribution over the areas where the first and second wings transition between the inboard wing portions and the outboard wing portions. As such, the aircraft may have a transition wing portion extending from the outboard end of the inboard wing portion to the inboard end of the outboard wing portion. Such a transition wing portion may form a graduated transition in one or more of the airfoil chord, airfoil twist, and airfoil shape from the airfoil at the outboard end of the inboard wing portion to the airfoil at the inboard end of the outboard wing portion. In such embodiments, where there is a transition wing portion, the inboard wing portion, the outboard wing portion, and the transition wing portion each may have a different sweep angle than the other wing portions.

In some embodiments, the planform transition from the inboard wing portion to the outboard wing portion occurs over some spanwise distance, which may, for example, be less than the average chord of the inboard wing portion. In some embodiments, the first and second wings may be configured such that there is an immediate transition between the inboard wing portion and the outboard wing portion resulting in a step from the inboard wing portion to the outboard wing portion in at least a portion of the wing.

Where the aircraft has at least two engines, a first engine may be positioned in major part over the inboard wing portion of the first wing and the second engine may be positioned in major part over the inboard wing portion of the second wing. In some embodiments, the first and second engines are positioned entirely within the areas extending above the inboard wing portions of the first and second wings, respectively.

In some embodiments, the engine mounting system is configured to mount the first and second engines to the first and second wings, respectively, while in other embodiments, the engine mounting system is configured to mount the first and second engines to the generally tubular fuselage.

The aircraft may, in some embodiments, include a first fence extending from the first wing and a second fence extending from the second wing, the first fence positioned between the inboard wing portion and the outboard wing portion of the first wing, and the second fence positioned between the inboard wing portion and the outboard wing portion of the second wing. Such fences may be configured to segregate at least a portion of the airflow flowing around the outboard wing portion and the inboard wing portion of each wing during flight. Such fences may also contribute to community noise shielding by blocking some engine noise paths radiating downward with a laterally outward component.

In some embodiments, the aircraft further includes a chord-extending device, such as a fowler flap, on each inboard wing portion of the first and second wings configured to extend the effective chord length of at least portions of the inboard wing portions. In such embodiments, the first and second aircraft engines may be positioned entirely within the area extending above the inboard wing portion of the first and second wings, respectively, when the chord-extending devices are fully extended. In general, any flaps on the inboard wing portions are configured to deflect downward relative to the proximate tangent planes of the lower surface of the wing during landing and take-off of the aircraft.

The first and second wings of the aircraft may be located in a low-wing, mid-wing, shoulder-wing, or high-wing configuration relative to the generally tubular fuselage. In general, the outboard wing portion has an aspect ratio that is greater than the aspect ratio of the entire wing and inboard wing portion has an aspect ratio that is less than aspect ratio of the entire wing. For example, in one embodiment, the overall wing aspect ratio of the combined first and second wings is greater than or equal to eight, while the effective aspect ratio of the outboard wing portion of each of the first and second wings is greater than eight. In one embodiment, the ratio of the average chord of the inboard wing portion to the average chord of the outboard wing portion is greater than or equal to three-halves.

In one embodiment, the trailing edge of each of the first wing and the second wing moves significantly aft from the trailing edge location of the inboard end of the outboard wing portion, to the trailing edge location of the outboard end of the inboard wing portion. For example, in one embodiment, the trailing edge moves significantly aft along a planform boundary that lies within 15 degrees of a streamwise direction. In such an embodiment, the aircraft may include an upwardly extending fence along the planform boundary and/or a downwardly extending fence along the planform boundary.

In one embodiment of the aircraft, the wing planform includes a leading edge glove on the leading edge of the inboard wing. In some embodiments, the aircraft has trailing edge variable camber elements on at least one of the inboard and the outboard trailing edges.

Embodiments of the present invention also provide for a method of manufacturing an aircraft comprising: (1) providing a generally tubular fuselage having a longitudinal axis; (2) mounting a first wing and a second wing to the generally tubular fuselage, the first and second wings configured for aerodynamically supporting the aircraft during flight, wherein the first and second wings each comprise at least two distinct wing portions including a shorter chord outboard wing portion and a longer chord inboard wing portion, wherein the shorter chord outboard wing portion has an average chord length that is less than the average chord length of the longer chord inboard wing portion, and wherein the longer chord inboard wing portion has a minimum chord length that is greater than the maximum chord length of the shorter chord outboard wing portion; (3) mounting a horizontal stabilizer to the generally tubular fuselage, the horizontal stabilizer being separate and distinct from the first and second wings; (4) providing a first engine and a second engine; and (5) mounting the first engine and the second engine to the aircraft such that the first and second engines are each positioned in major part over the longer chord inboard wing portion of the first and second wings, respectively, so that an area below the aircraft is at least partially shielded from the sound of the first and second engines by the longer chord inboard wing portions.

The method may further include providing fowler flaps on the longer chord inboard wing portions of the first and second wings, and/or mounting the first and second engines over the inboard wing portions in the region of the fowler flaps. In one embodiment, the method further includes forming the first and second wings such that the average lift coefficient of the airfoils that make up the inboard wing portions is less than the average lift coefficient of the airfoils that make up the outboard wing portions. In some embodiments, the method may include forming the first and second wings such that airfoil of the outboard end of the inboard wing portion has a lift coefficient that is less than the lift coefficient of the airfoil of the inboard end of the outboard wing portion such that there is a substantially smooth spanwise lift distribution curve over the transitions between the inboard wing portion and the outboard wing portion.

Embodiments of the present invention further provide for a method of shielding communities from engine noise generated by an engine of an aircraft, the aircraft comprising a wing for aerodynamically supporting the aircraft during flight and a horizontal stabilizer separate and distinct from the wing. Such a method may include providing at least two distinct wing portions including a shorter chord outboard wing portion and a longer chord inboard wing portion, wherein the shorter chord outboard wing portion has an average chord length that is less than the average chord length of the longer chord inboard wing portion, wherein the longer chord inboard wing portion has a minimum chord length that is greater than the maximum chord length of the shorter chord outboard wing portion, and wherein the engine is positioned in major part over the longer chord inboard wing portion of the wing so that an area below the aircraft is at least partially shielded from the sound of the engine by the longer chord inboard wing portion. The method may further include providing a chord-extending device in the leading edge or the trailing edge of the longer chord inboard wing portion proximate the spanwise location of the engine; and extending the chord-extending device to shield a larger area below the aircraft from the sound of the engine.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
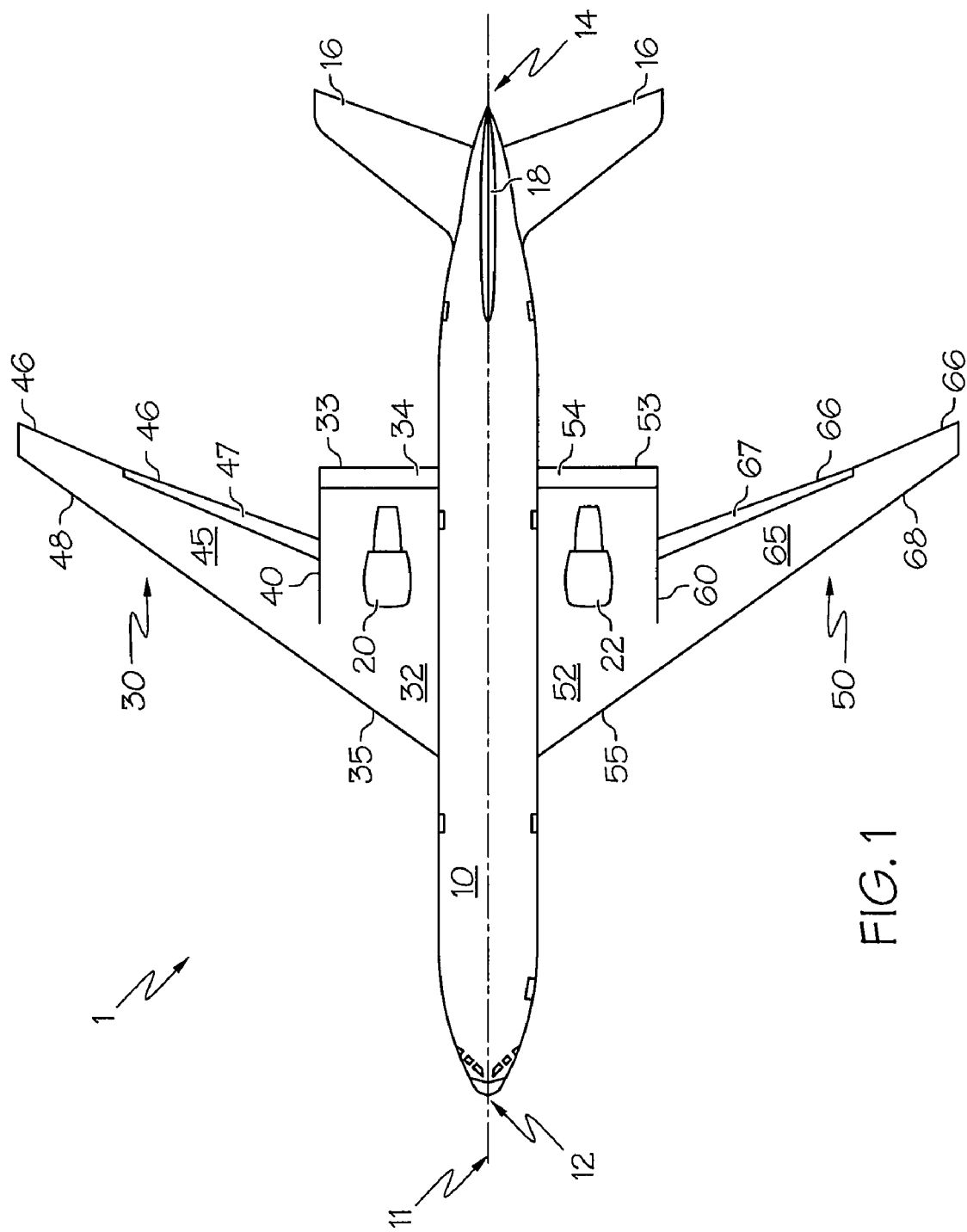
Figure 2:
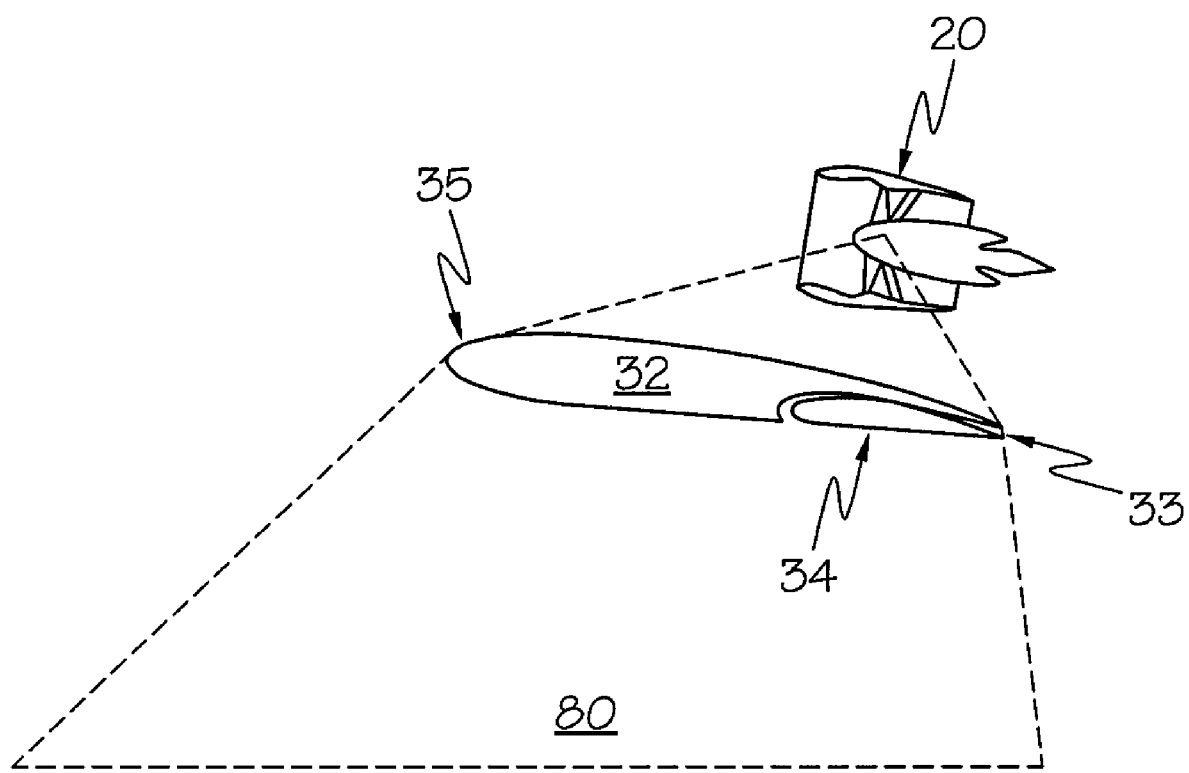
Figure 3A:
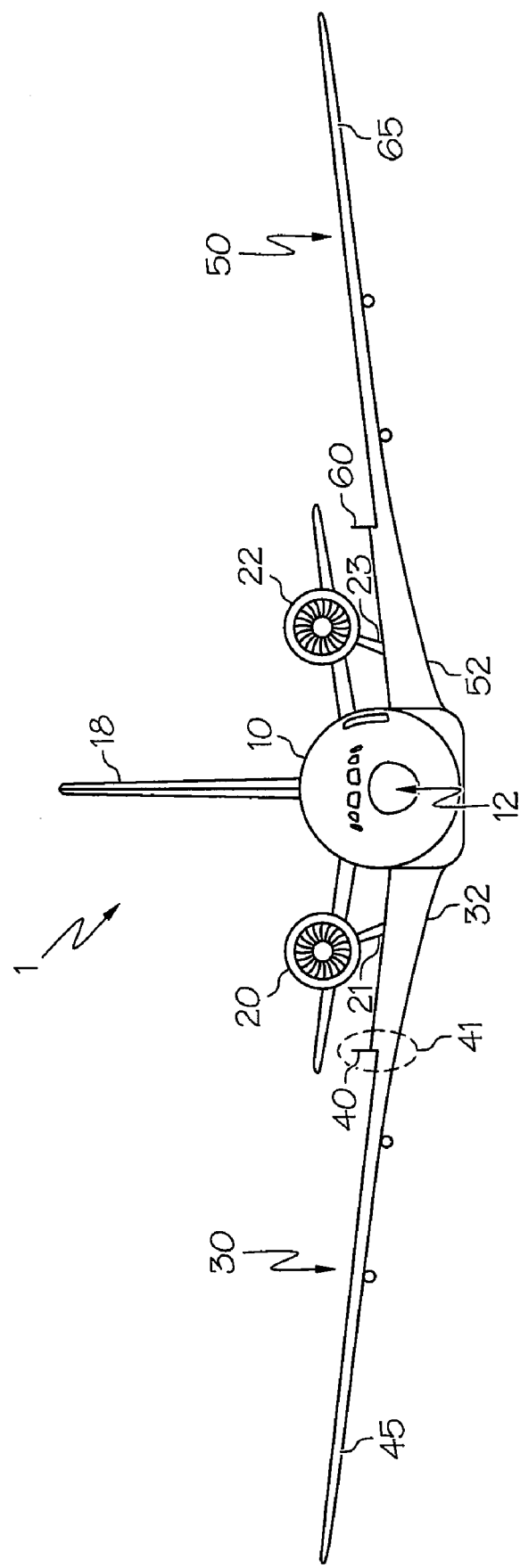
Figure 3B:
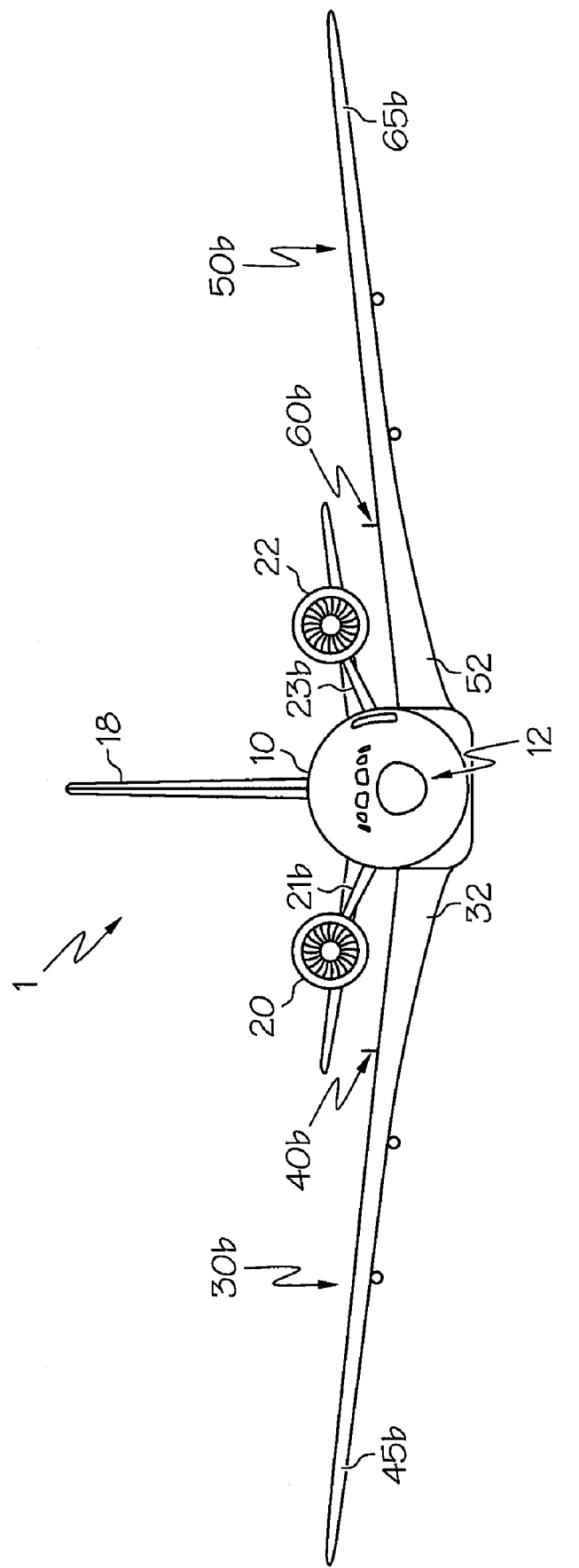
Figure 4A:
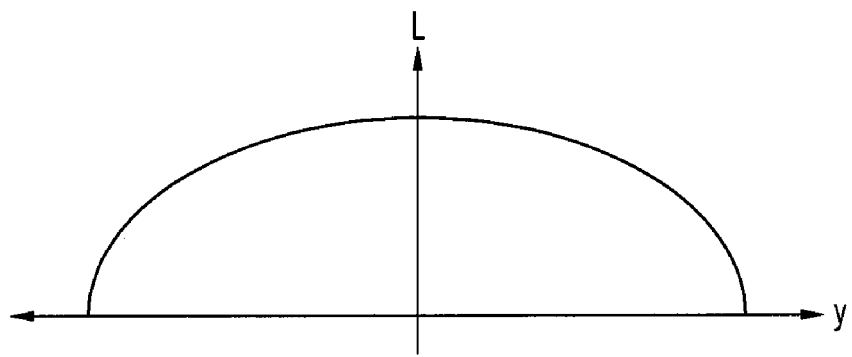
Figure 4B:
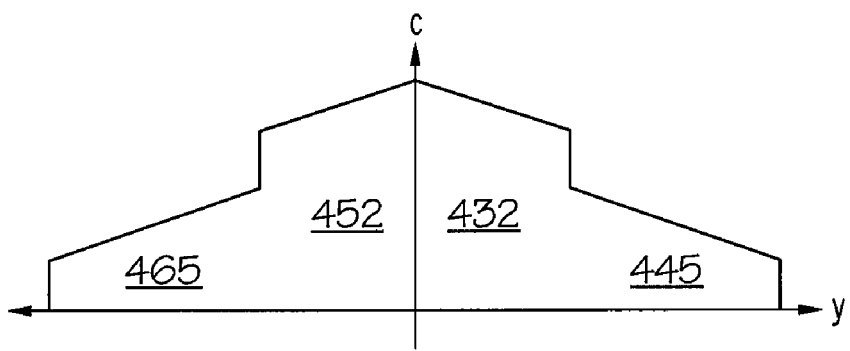
Figure 5:
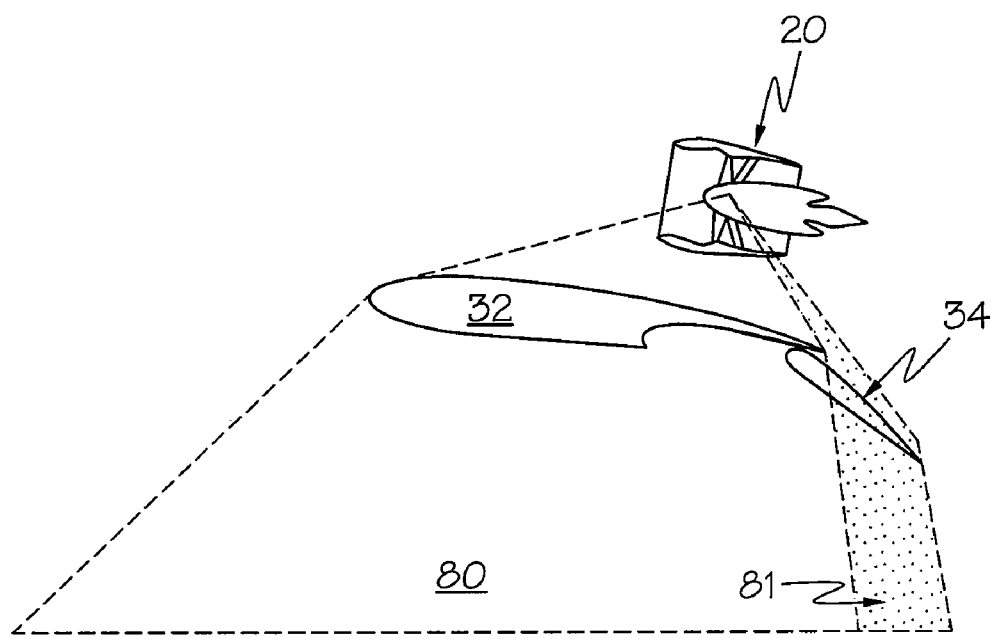
Figure 6:
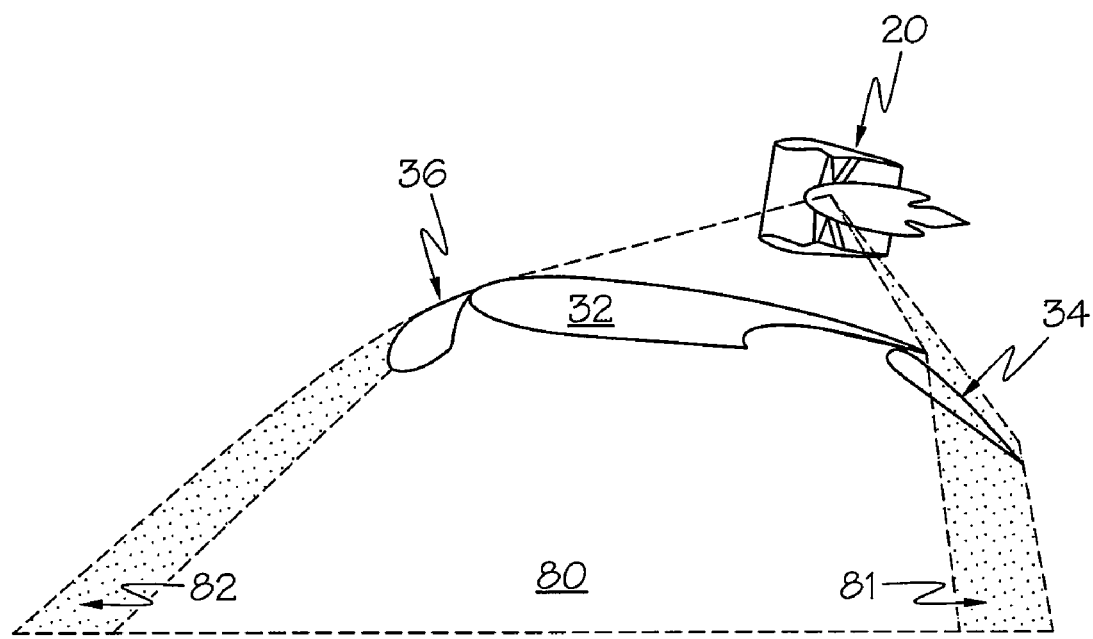
Figure 7:
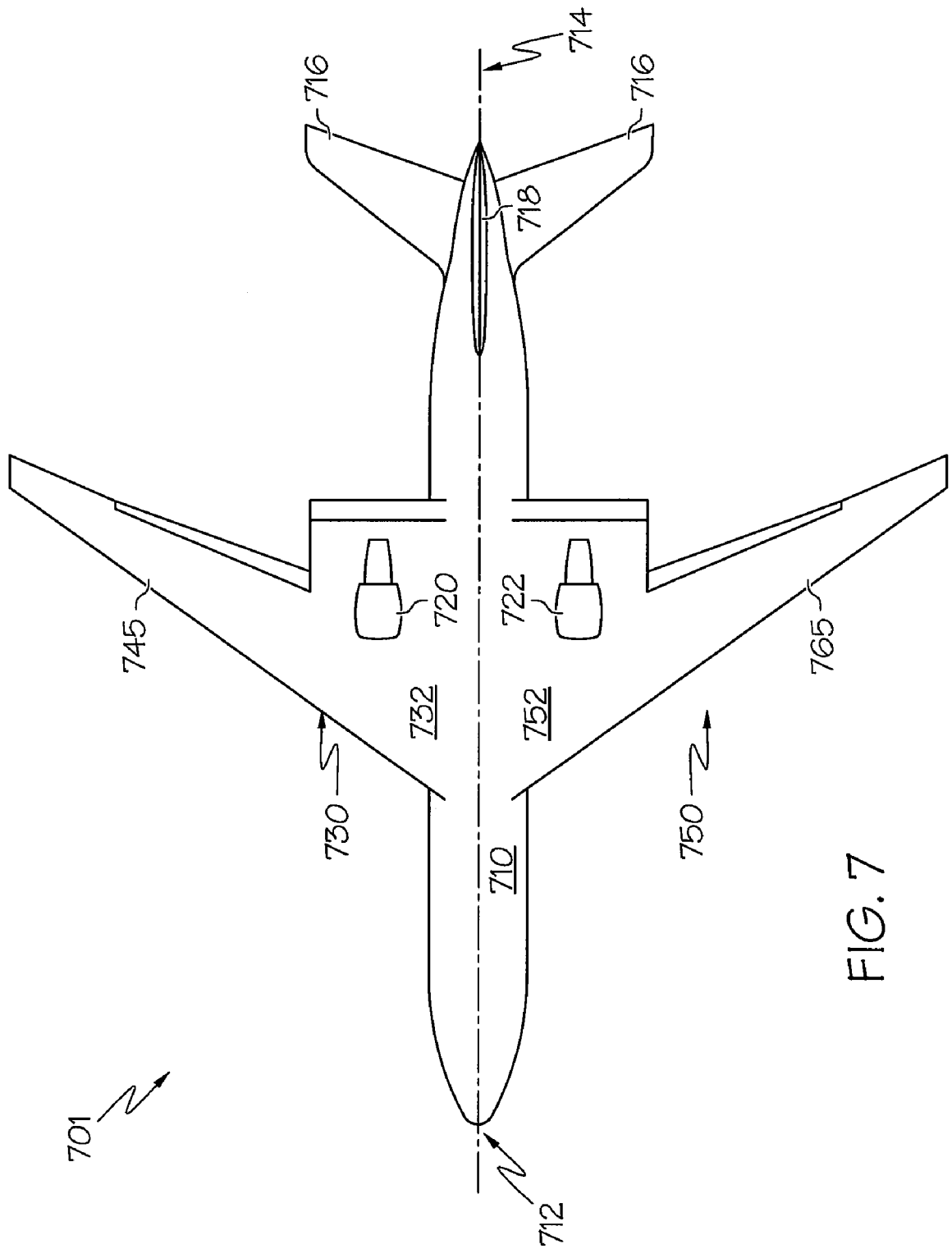
Figure 8:
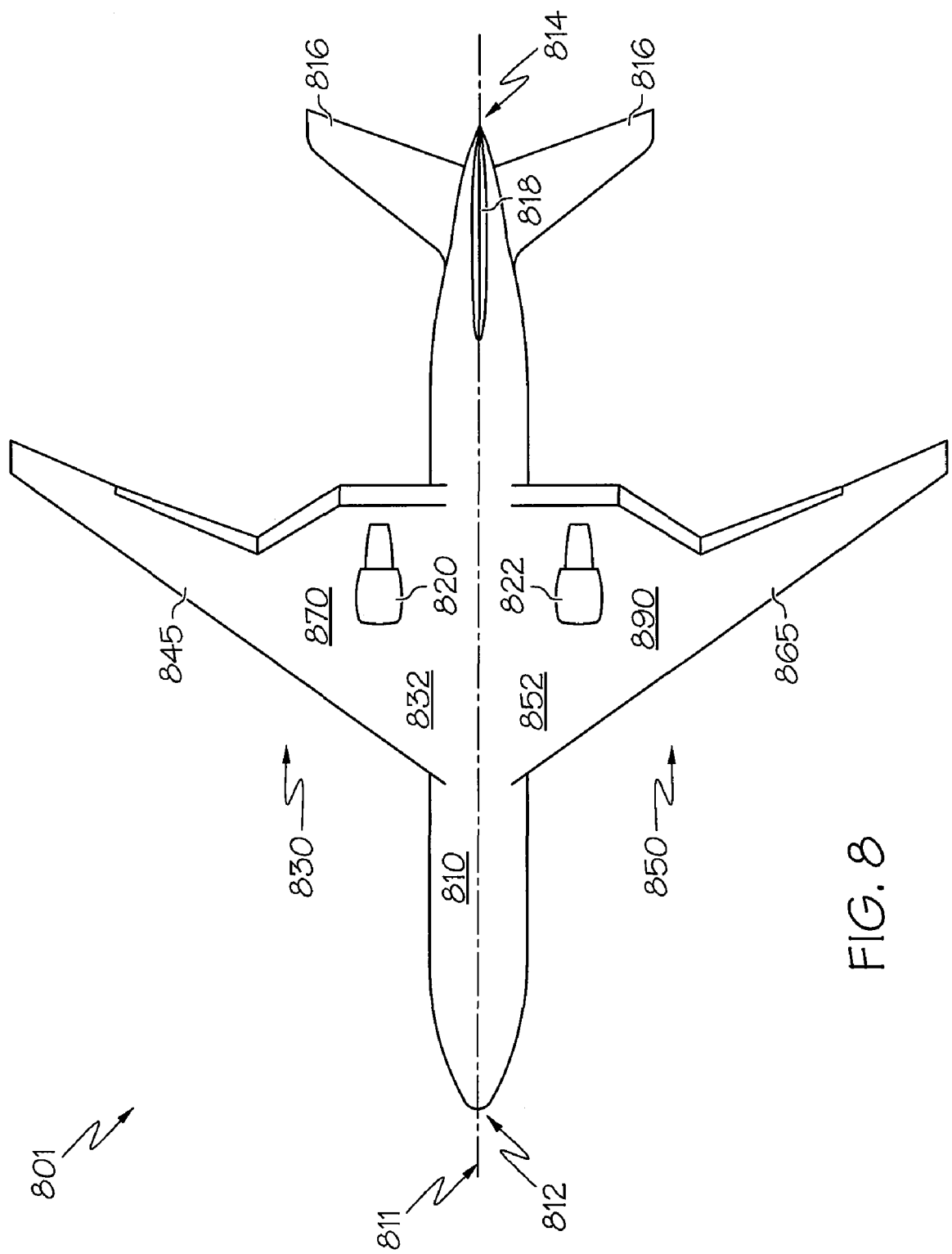
Figure 9:
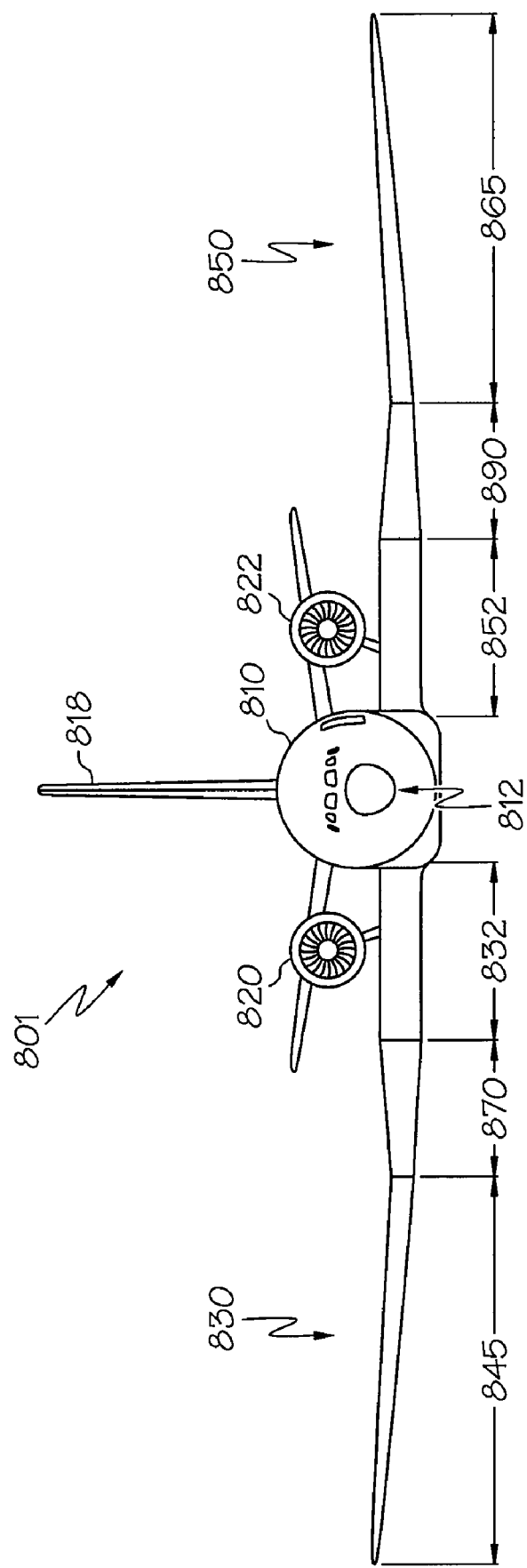
Figure 10:
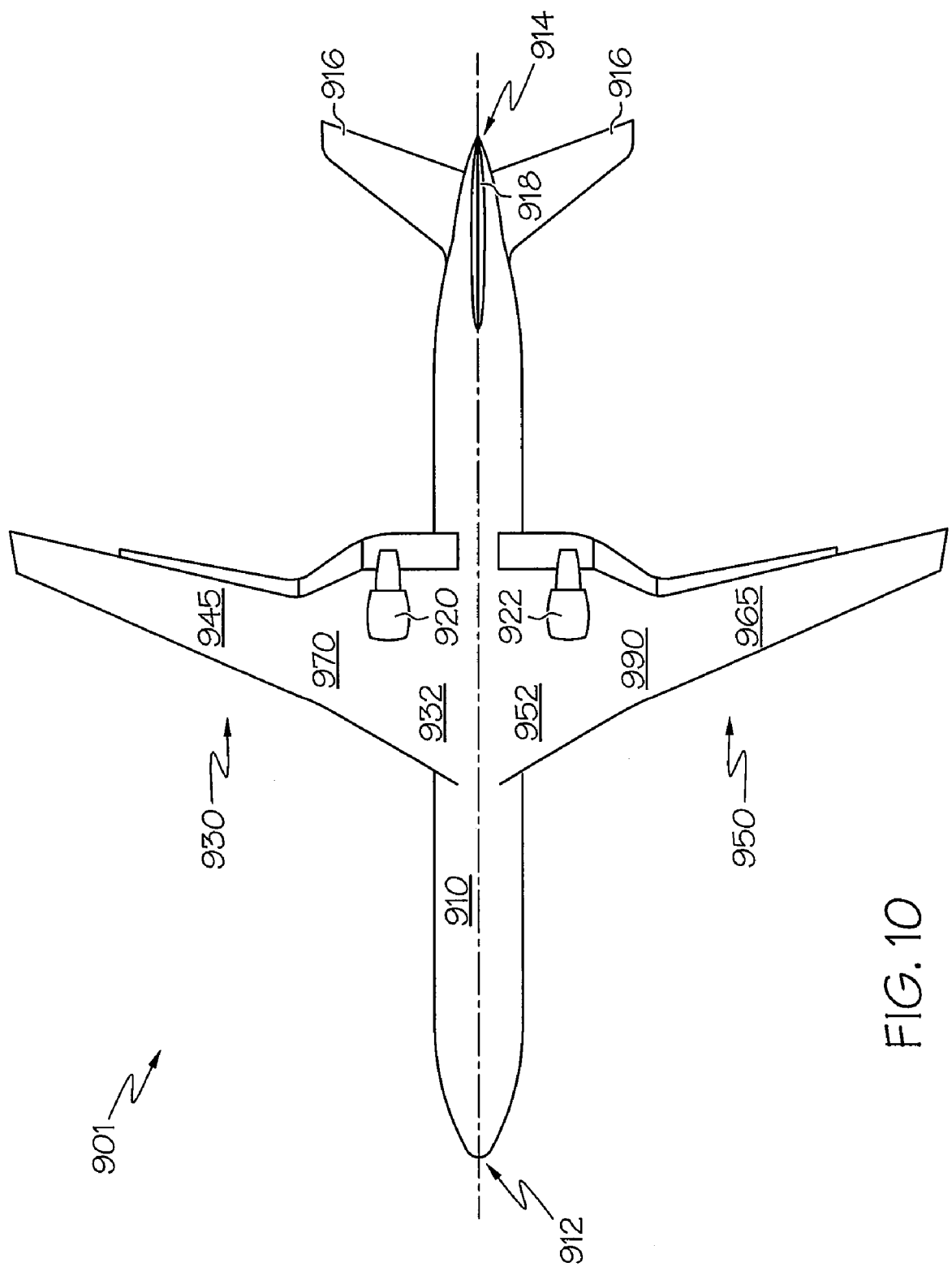
Figure 11:
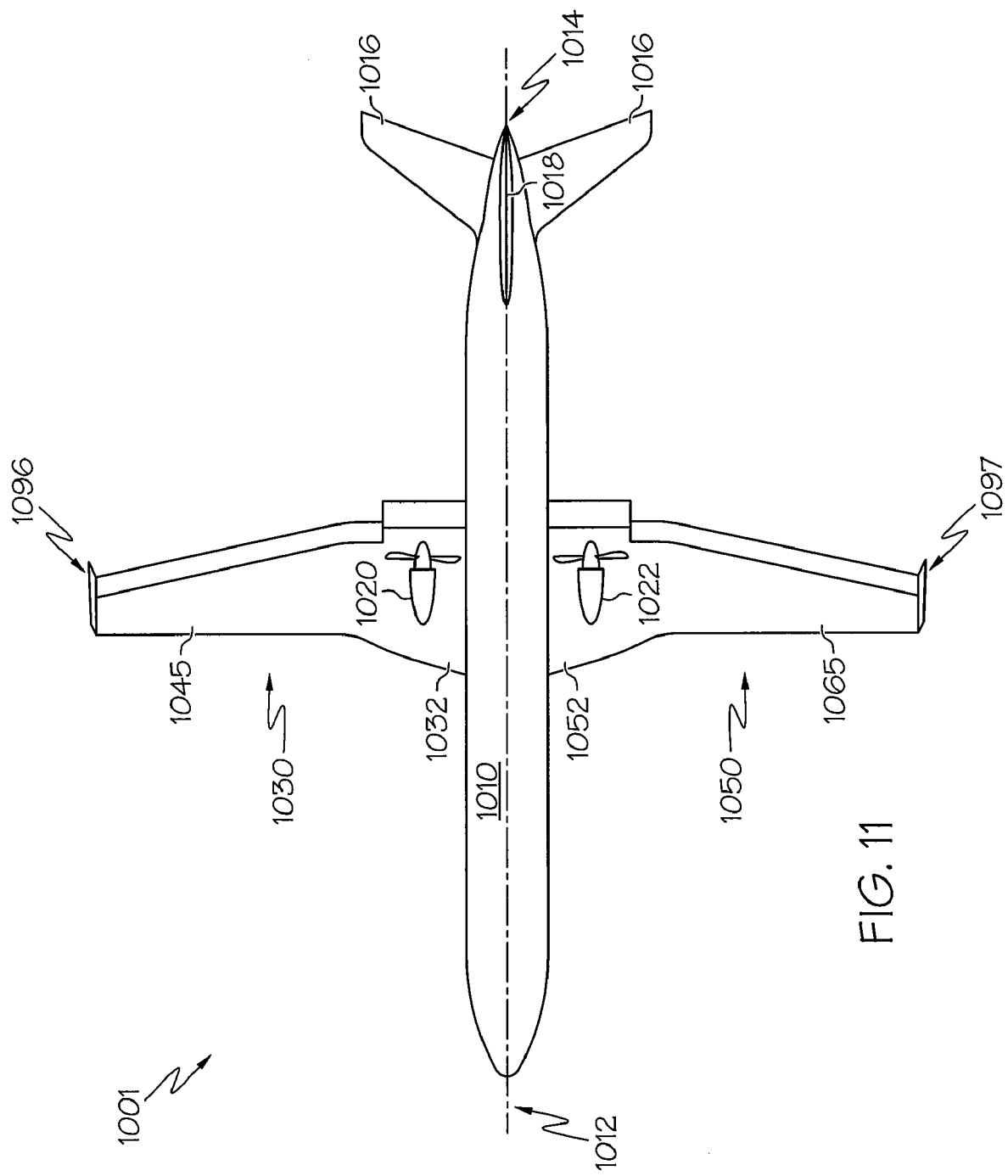
Figure 12:
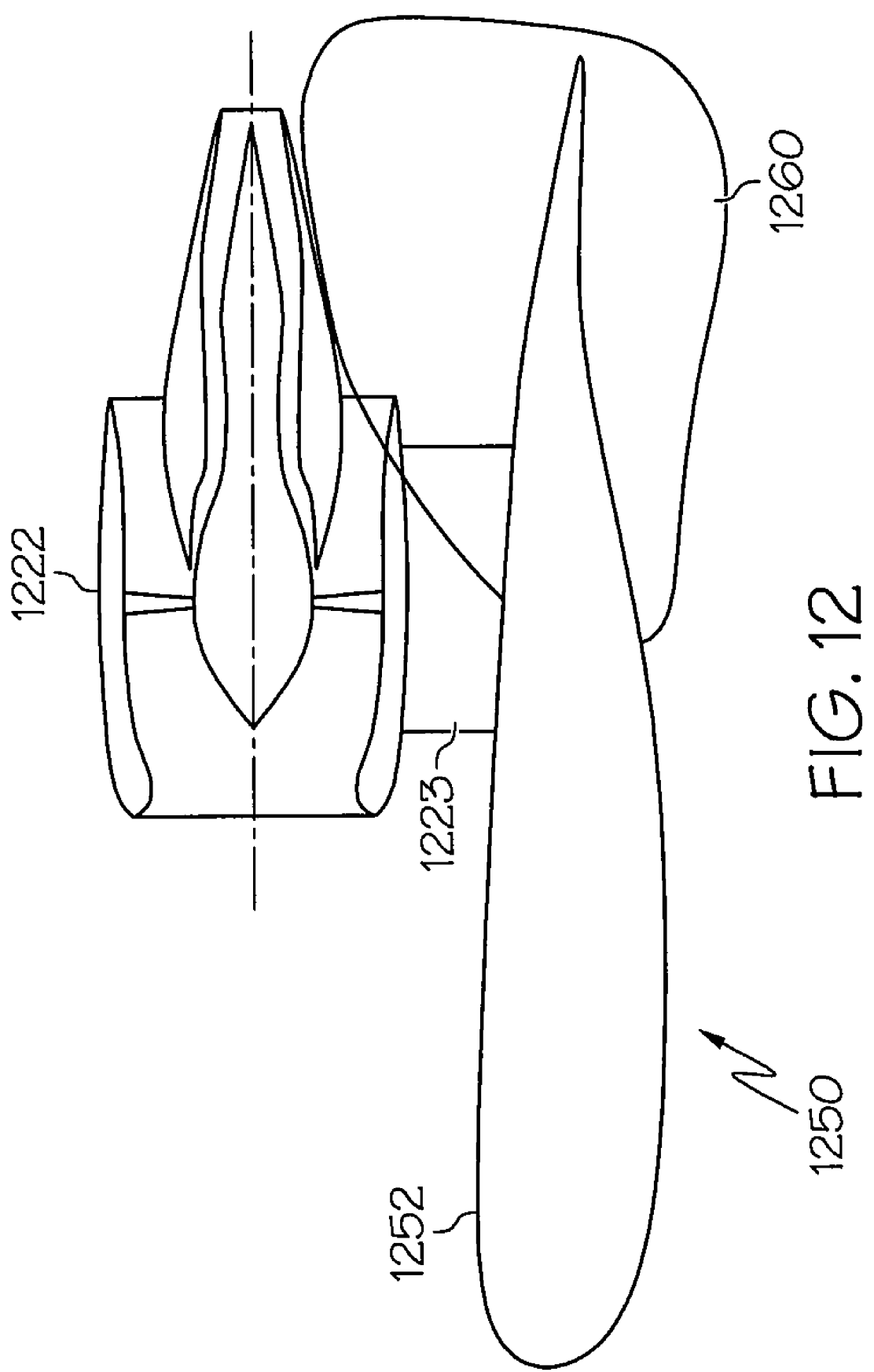
Figure 13:
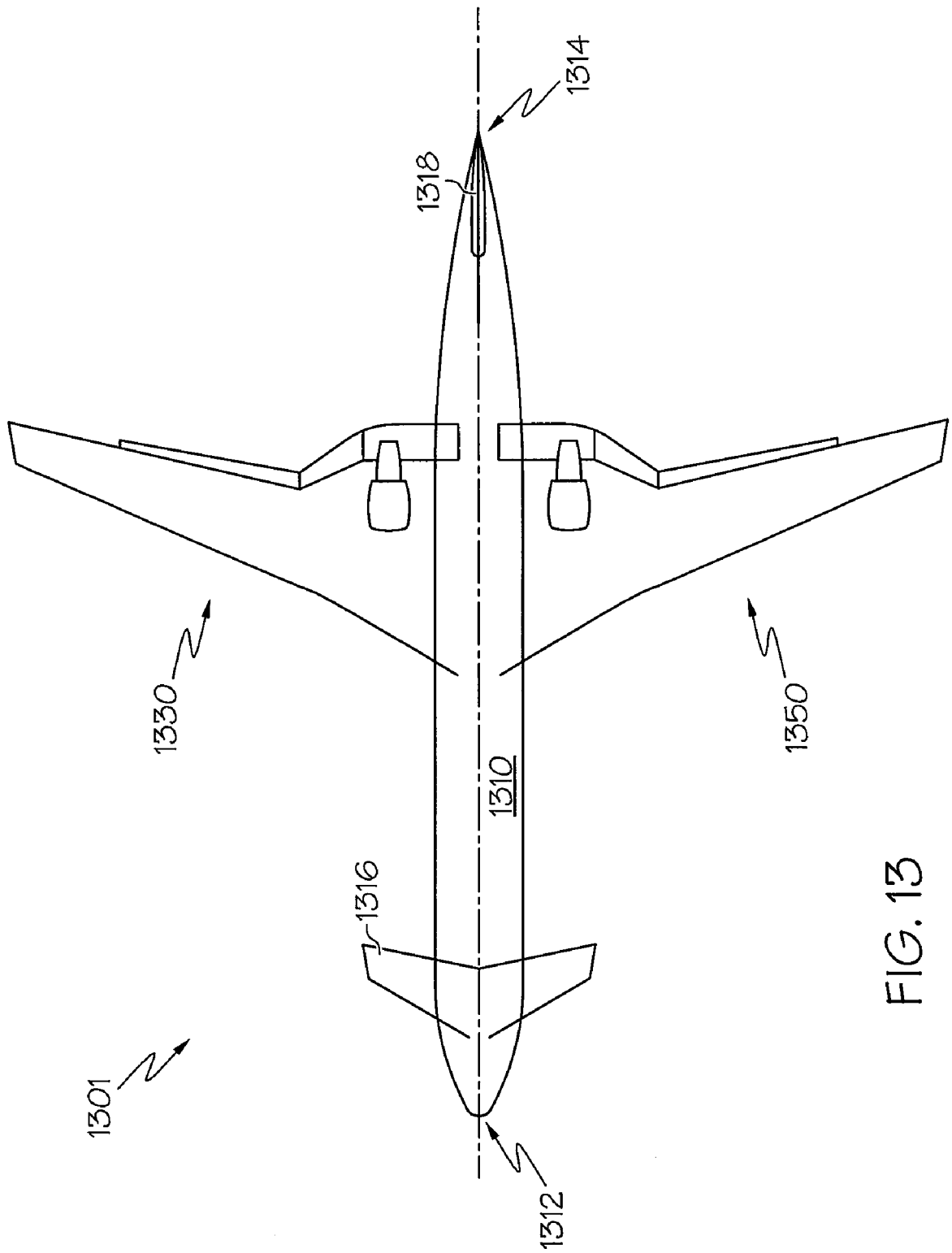
Figure 14:
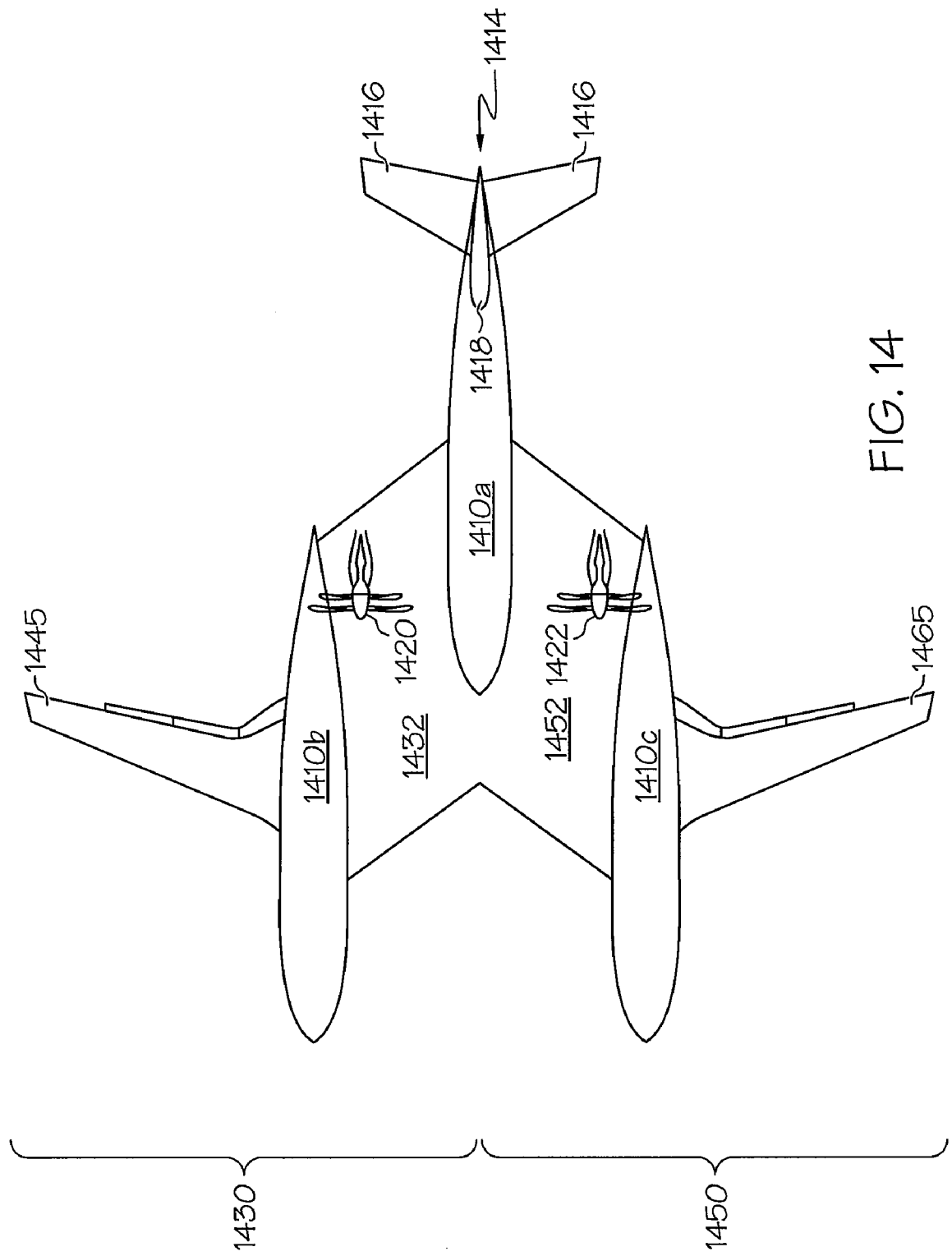
Figure 15:
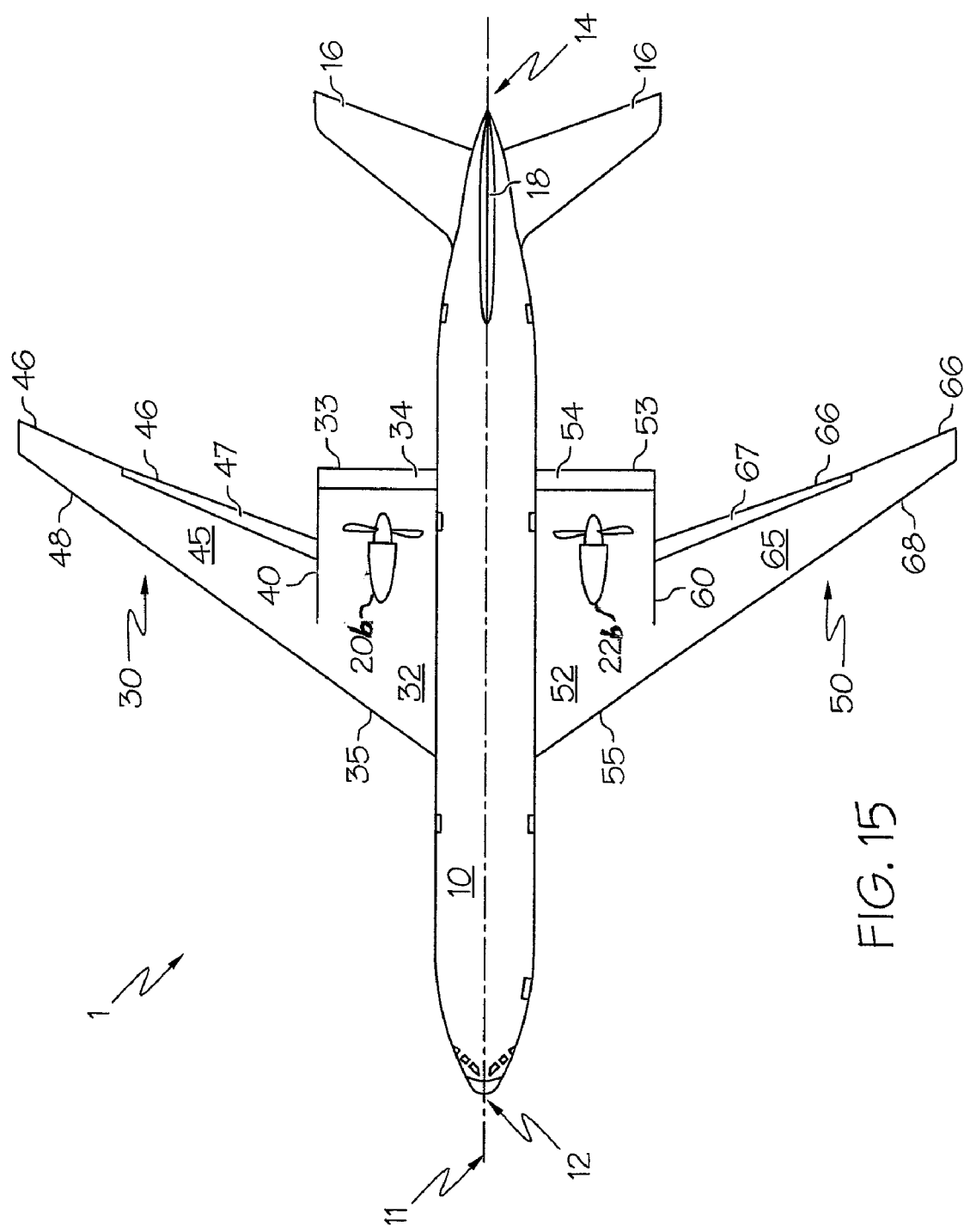

Having thus described embodiments of the invention in general terms, reference will now be made to the accompanying drawings, which are not necessarily drawn to scale, and wherein:

FIG. 1 illustrates a top plan view of a low-wing aircraft configured in accordance with an embodiment of the present invention;

FIG. 2 illustrates a cross-sectional view of the inboard wing portion and the engine of FIG. 1 showing the engine placement relative to the inboard wing portion and illustrating the engine noise shielding in accordance with an embodiment of the present invention;

FIG. 3(a) illustrates a front view of the aircraft of FIG. 1 in accordance with an embodiment of the present invention;

FIG. 3(b) is a front view of the aircraft similar to the aircraft of FIG. 1 in accordance with another embodiment of the present invention;

FIG. 4 provides an illustration (not necessarily drawn to scale) of the spanwise distributions of lift, chord length, and local lift coefficient for a wing configured in accordance with an embodiment of the present invention;

FIG. 5 illustrates a cross-sectional view of the inboard wing portion and the engine of FIG. 1 illustrating the inboard wing portion having a fowler flap in accordance with an embodiment of the present invention and illustrating the increased shielding resulting from the fowler flap motion;

FIG. 6 illustrates a cross-sectional view of the inboard wing portion and the engine of FIG. 1 illustrating the inboard wing portion having both leading-edge and trailing-edge high lift devices in accordance with an embodiment of the present invention and illustrating the increased shielding resulting from the extension of the high lift devices;

FIG. 7 illustrates a top plan view of a high-wing aircraft configured in accordance with another embodiment of the present invention;

FIG. 8 illustrates a top plan view of an aircraft having a transitional wing portion between the inboard wing portion and the outboard wing portion in accordance with an embodiment of the present invention;

FIG. 9 illustrates a front view of an aircraft having a transitional wing portion between the inboard wing portion and the outboard wing portion in accordance with an embodiment of the present invention;

FIG. 10 illustrates a top plan view of an aircraft similar to the aircraft of FIGS. 8 and 9, but having smoother more gradual transitions between inboard wing portions, the transition wing portions, and the outboard wing portions, in accordance with an embodiment of the present invention;

FIG. 11 illustrates a top plan view of an aircraft having a forward swept outboard wing portion and two prop engines in a pusher configuration in accordance with an embodiment of the present invention;

FIG. 12 illustrates a side section view of a wing and engine showing a wing fence in accordance with an embodiment of the present invention;

FIG. 13 illustrates a top plan view of an aircraft having a canard configuration in accordance with an embodiment of the present invention;

FIG. 14 illustrates a top plan view of an aircraft having three fuselages, where a fuselage separates the inboard wing portions from the outboard wing portions in accordance with an embodiment of the present invention; and FIG. 15 illustrates a top plan view of the aircraft of FIG. 1 having open fan prop engines in a pusher configuration instead of turbofans in accordance with an embodiment of the present invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Referring to the drawings, FIG. 1 illustrates a top plan view of an aircraft 1 configured in accordance with an exemplary embodiment of the present invention. Although FIG. 1 illustrates an aircraft 1 having a low-wing configuration, other embodiments of the present invention may be configured with a high-wing, shoulder-wing, or mid-wing configuration as illustrated, for example, in other figures described herein. Similarly, although the figures illustrated herein generally depict swept and tapered wings, other embodiments of the present invention may have straight and/or un-tapered wings. Furthermore, although the figures described herein generally depict a commercial-type aircraft, embodiments of the present invention may be used for any type aircraft, including private, commercial, or military aircraft, and for aircraft of any size or shape.

FIG. 1 illustrates a commercial aircraft 1 having a generally tubular fuselage 10. The generally tubular fuselage 10 has a nose 12 on one end and a tail 14 on the other end. The nose 12 and the tail 14 define a longitudinal axis 11 of the fuselage therebetween. The aircraft 1 also has a horizontal stabilizer 16 and a vertical stabilizer 18. The horizontal stabilizer 16 and the vertical stabilizer 18 both extend from the fuselage 10 proximate the tail 14. In the illustrated embodiment, the horizontal stabilizer 16 is comprised of two wings, smaller than the aircraft's main wings 30 and 50, extending from opposite sides of the fuselage 10 aft of the main wings 30 and 50. In other embodiments of the invention, however, the horizontal stabilizer 16 may be located proximate the nose 12 of the aircraft (e.g., in a canard configuration) or may extend from other areas of the fuselage 10 fore and aft of the main wings 30 and 50. In still other embodiments, the horizontal stabilizer 16 may extend from the vertical stabilizer 18 or, alternatively, the vertical and horizontal stabilizers may be combined into, for example, a v-type, y-type, x-type, u-type, w-type, or o-type configuration. As will be apparent to one of ordinary skill in the art in view of this disclosure, the horizontal and vertical stabilizers may be configured in a number of ways without departing from the spirit and scope of embodiments of the present invention.

FIG. 1 further illustrates a first wing 30 and a second wing 50 each extending from opposite sides of the fuselage 10. Although the aircraft wing is generally described herein in terms of a "first wing" and a "second wing," such terminology is not meant to restrict the invention to embodiments where there are two separate wings. In this regard, in some embodiments of the present invention, the "first wing" and the "second wing" may be portions of a one-piece wing.

Referring again to FIG. 1, a first engine 20 and a second engine 24 are positioned over the first wing 30 and the second wing 50, respectively. In other embodiments of the present invention, the aircraft 1 may have more or less than two engines. Although, in accordance with embodiments of the present invention, at least one engine is generally positioned at least in major part over at least a portion of a wing, the other engines, where present, may or may not be positioned over the wings depending on the specific embodiment of the present invention.

As illustrated in FIG. 1, the engines 20 and 22 are shrouded turbofans; however, in other embodiments of the invention, the engines 20 and 22 may include turboprops, turboshafts, tractor props, pusher props, prop-fans, open fans, open rotors, geared fans, ducted propellers, pulse jets, or any other type of aircraft engine. For example, FIG. 15 illustrates an embodiment of the aircraft of FIG. 1 where open fans such as pusher props 20b and 22b are shown instead of the shrouded turbofans depicted in FIG. 1. In some embodiments, the engines 20 and 22 are mounted to the first wing 30 and second wing 50, respectively. In other embodiments, however, the engines 20 and 22 are mounted to either side of the fuselage 10.

As illustrated in FIG. 1, the first wing 30 extends from a first side, in this case the starboard side, of the fuselage 10 and the second wing 50 extends from a second side, here the port side, of the fuselage 10. The first wing 30 has an inboard wing portion 32 and an outboard wing portion 45. The inboard wing portion 32 and the outboard wing portion 45 each have an inboard end and an outboard end. The inboard end of the inboard wing portion 32 is adjacent to the fuselage 10 and the outboard end of the inboard wing portion 32 is adjacent to the inboard end of the outboard wing portion 45. In one embodiment, the semispan of the inboard wing portion 32 accounts for between 15% and 35% of the semispan of the first wing 30.

The inboard wing portion 32 has a longer average chord length than the average chord length of the outboard wing portion 45. The engine 34 is positioned at least in major part over the inboard wing portion 32 such that the greater chord length of the inboard wing portion 32 provides greater shielding of the engine noise below, fore, and/or aft of the engine 20. In other words, the wing area of the wing 30 is unevenly distributed such that a greater percentage of the wing area is positioned below the engine 20 where it can provide substantial increases in the shielding of engine noise. The outboard wing portion 45, however, has a smaller chord and a higher aspect ratio than the inner wing portion 32 since, at a certain position outboard from the engine, the diminishing incremental benefit in engine noise shielding resulting from extending the longer chord region further outboard is outweighed by other design considerations, such as the desire to have an efficient wing with low induced drag and without excessive wetted area, associated parasite drag, and structural weight.

FIG. 2 depicts a cross-section of the inboard wing portion 32 and the engine 20 in accordance with an embodiment of the present invention. FIG. 2 illustrates how the engine 20 may be positioned in major part over the inboard wing portion 32 in accordance with an embodiment of the present invention. As illustrated, while the engine 20 is positioned in major part over the wing, in some embodiments some minor portion of the engine 20 may extend fore or aft of the inboard wing portion's trailing edge 33 or leading edge 35. In other embodiments, the engine 20 may be positioned completely within an area extending vertically from the wing or perpendicularly to the chord line (an imaginary line extending from the leading edge 35 to the trailing edge 33). In one embodiment, the engine centerline is located above the wing surface at a distance that is between 0.4 to 1.2 times the engine length to provide good clearance while still providing good sound shielding characteristics. In other embodiments, the engine is located at other distances above the wing surface.

FIG. 2 further provides an illustration of the engine noise shielding provided by the inner wing portion 32. Assuming for the sake of illustration that the engine noise emanates from the center of the engine 20 in all directions surrounding the engine 20, the dashed lines illustrate how a certain wedge of the emanating sound waves (i.e., the wedge of sound waves directed toward the upper surface of the inboard wing portion 32) will generally be reflected in other directions such that an area 80 below the inboard wing portion 32 is significantly shielded from the sound waves emanating from the engine 20.

Referring again to FIG. 1, it can be seen that another further characteristic of the wing configuration of embodiments of the present invention is the fact that the minimum chord length of the inboard wing portion 32 is significantly greater than the maximum chord length of the outboard wing portion 45. As such, the shape and/or size of the wing cross-section at the outboard end of the inboard wing portion 32 typically will not match the shape and/or size of the wing cross-section at the inboard end of the outboard wing portion 45. As such, the wing must transition from the outboard end of the inboard wing portion 32 to the inboard end of the outboard wing portion 45. In the embodiment of the invention illustrated in FIG. 1, the wing planform makes the transition from the inboard wing portion 32 to the outboard wing portion 45 by way of a sudden step in the wing's trailing edge. In other embodiments, the wing planform could also make the transition with a sudden step in the wing's leading edge or with a sudden step in both the wing's leading and the trailing edges.

Referring now to FIG. 3(a), which illustrates a front view of the aircraft 1 illustrated in FIG. 1, it can be seen how, in at least some embodiments, the wing cross-sections of the outboard end of the inboard wing portion 32 and the inboard end of the outboard wing portion 45 will generally not align with each other. As can be seen in FIG. 3, since the inboard wing portion has a greater chord (and since, as described in greater detail below, the airfoil of the outboard end of the inboard wing portion 32 may be different than the airfoil of the inboard end of the outboard wing portion 45) the cross-section of the inboard wing portion 32 will typically be thicker than the cross-section of the outboard wing portion 45. As illustrated in FIGS. 1 and 3, the difference in shape and/or thickness may be transitioned by a sudden step in the wing. While, in some embodiments, the step may exist around the entire outside surface of the wing at the transition 41, in other embodiments, such as the embodiment illustrated in FIGS. 1 and 3, the wing may be configured such that a portion of the inboard and outboard cross-sections (such as the leading-edge portion and some part of the lower surface) line-up at the transition 41 so that the step is only present on a portion of the wing at the transition 41.

FIG. 3(*a*) further illustrates how, in some embodiments of the invention, a fence 40 extending from at least portions of the wing 30 where the wing 30 transitions from the inboard wing portion 32 to the outboard wing portion 45. The fence 40 is generally substantially vertical or substantially perpendicular to the wing or wing surface (although, as will be apparent to one of ordinary skill in the art in view of this disclosure, the fence 40 may extend from the wing 30 at a variety of angles depending on the design considerations of the specific embodiment of the invention). In this way, the fence 40 may segregate the flow regions between at least portions of the inboard and outboard wing portions to reduce interference between the two air flow patterns. The fence 40, therefore, may be particularly desirable in embodiments where the wing transitions immediately from the inboard end of the outboard wing portion 45 to the outboard end of the inboard wing portion 32, for example, as illustrated in FIG. 3. The fence 40 may also perform an additional function by shielding engine noise directed outward and downward from the engine 20 in the spanwise direction.

In the exemplary embodiment of invention illustrated in FIGS. 1 and 3(*a*), the fence 40 extends from an aft portion of the upper surface of the wing 30 to segregate the flow regions between the aft portions of the upper inboard and upper outboard wings, and to allow the aft upper surface contours to vary across the transition 41.

FIG. 3(*a*) also illustrates how the engine 20 may be mounted to the wing 30 in accordance with an embodiment of the present invention. Specifically, in the illustrated embodiment, the engine 20 is mounted over the wing 30 by an engine mount 21 extending from the upper surface of the inboard wing portion 32. As described above, however, and as will be apparent to one of ordinary skill in the art in view of this disclosure, the engine 20 may be mounted to the fuselage 10 or to other parts of the aircraft 1 as an alternative to or in addition to mounting the engine 20 to the wing 30.

For example, FIG. 3(*b*) is a front view of an aircraft similar to the aircraft of FIG. 1 and illustrates how, in some embodiments of the present invention, the engines 20 and 22 may be mounted to the fuselage 10 instead of the wings. FIG. 3(*b*) also illustrates how, in some embodiments of the present invention, the wing may be configured such that the thickness of the outboard end of the inboard wing portion 32 may be substantially similar to the thickness of the inboard end of the outboard wing portion 45*b*. As such, in some embodiments, the aircraft may not have a significant step in thickness across the span. Despite not having a step in thickness or geometry, a fence 40*b* may still be used to segregate portions of the inboard wing portion 32 from portions of the outboard wing portion 45*b*.

The second wing 50 extending from the port side of the aircraft 1 is substantially symmetrical to the first wing 30 described above. As such, like the first wing 30, the second wing 50 has a longer chord inboard wing portion 52 and a shorter chord outboard wing portion 65. The second engine 22 is positioned in major part over the longer chord inboard wing portion 52 such that a significant area below the aircraft 1 is shielded from the engine noise directed downward, fore, and/or aft of the engine 22 by the inboard wing portion 52. The second wing 50 may further include a fence 60 for segregating the flow regions between the inboard wing portion 52 and the outboard wing portion 65 and/or to reflect engine noise emanating outward and downward from the engine 22 along the wing span.

As illustrated in FIG. 1, the outboard wing portions 45 and 65 may typically have a moderate or high aspect ratio and may typically use airfoils (wing cross-sections) with moderate or high lift coefficients when the aircraft 1 is at low angles of attack such as at typical cruise conditions. For example, in an exemplary embodiment, the aspect ratio of the overall wing (i.e., the combination of the first wing 30 and a second wing 50), which is defined as the wingspan squared divided by the wing area or equivalently as the wingspan divided by the average wing chord, may be approximately eight; however, the aspect ratio of the outboard wing portions 45 and 65 when viewed alone (i.e., the sum of the spans of the left and right outboard wing portions divided by the average chord of the outboard wing portions) may be greater than eight. In contrast, since the inboard wing portions 32 and 52 have a longer chord than the outboard wing portions 45 and 65 to provide the increased community noise shielding, the inboard wing portions 32 and 52 will generally have a low aspect ratio (when viewed separate from the rest of the wing). For example, the aspect ratio of the inboard wing portions when viewed alone (i.e., the sum of the spans of the left and right inboard wing portions divided by the average chord of the inboard wing portions) may be less than or equal to six, or even less than two in some instances, such as in the embodiment illustrated in FIG. 1.

Furthermore, while the outboard wing portions 45 and 65 may typically use airfoils having moderate to high lift coefficients, the airfoils used on the inboard wing portions 32 and 52 will generally be configured to operate at lower lift coefficients than the outboard airfoils, such that the overall dimensional lift distribution (e.g., pounds lift per foot of span) is smoothly varying and of a desired shape over the entire span. In this way, the aircraft's wings can be configured to achieve a desired induced drag and weight despite the fact that the wing has an enlarged inboard wing portion configured for shielding engine noise.

FIG. 4 provides an illustration (not necessarily drawn to scale) of the spanwise distributions of lift, chord length, and local lift coefficient for a wing configured in accordance with an exemplary embodiment of the present invention. FIG. 4(*b*) plots the chord length, c, of the wing versus the location, y, along the span of the wing. The origin of the y-axis is placed between the port and starboard wings such that the positive y-axis represents one wing and the negative y-axis represents the other wing. For illustration purposes, FIG. 4 is drawn assuming that the first and second wing planforms extend through the fuselage until they meet in the center of the fuselage. FIG. 4(*b*) illustrates the spanwise chord distribution for a wing having tapered longer-chord inboard wing portions 432 and 452 and tapered shorter-chord outboard wing portions 445 and 465. As with the embodiment of the wing illustrated in FIGS. 1 and 3, the wing illustrated in FIG. 4(*b*) also transitions sharply between the inboard wing portions 432 and 452 and the outboard wing portions 445 and 465.

FIG. 4(*a*) illustrates an exemplary lift distribution of the wing whose chord and local lift coefficient distributions are plotted in FIGS. 4(*b*) and 4(*c*), respectively. In particular, FIG. 4(*a*) plots the lift force, L, per unit span versus the spanwise location, y. In the embodiment illustrated in FIG. 4, the wing generates a lift distribution that is somewhat elliptical in shape. As is well-known in the art, a wing's induced drag is theoretically minimized, in the absence of transonic effects, when the wing is configured to generate an elliptical spanwise lift distribution. Concerns other than induced drag, however, also play a role in determining the desired lift distribution, such as concerns about bending moments at the wing root and manufacturing costs. For example, it is also well known in the art that inboard wing bending moments and, thereby, inboard wing weight are reduced if the spanwise load distribution is more triangular, rather than elliptical. The various concerns are then balanced in a desired fashion to optimize the aircraft for a variety of considerations, such as fuel burn per seat-mile or cash operating cost per seat-mile.

Figure 4C:
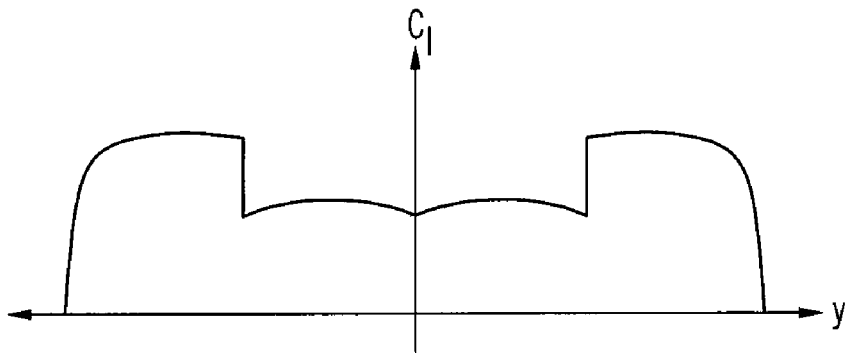

In general, however, it is desirous to have a lift distribution that at least somewhat resembles the elliptical form illustrated in FIG. 4(a). FIG. 4(c) plots the local airfoil lift coefficients, $C_1$, versus spanwise location, y, for a wing configured in accordance with an exemplary embodiment where FIG. 4(a) is the desired lift distribution. As illustrated in FIG. 4(c) embodiments of the present invention will generally be configured such that the average local airfoil lift coefficient for the inboard wing portions is lower than the average local airfoil lift coefficient for the outboard wing portions.

Furthermore, even if an elliptical lift distribution is not desired, it is still generally desirous to have at least a somewhat smoothly varying transition between the lift distributions of the inboard and outboard wing portions during, for example, cruise and climb conditions. As such, the outboard end of the inboard wing portion is generally configured to have a lower airfoil lift coefficient than the airfoil lift coefficient of the inboard end of the outboard wing portion at a given typical cruise or climb angle of attack of the wing. FIG. 4(c) illustrates an exemplary lift coefficient distribution where the outboard end of the inboard wing portion is configured to have a lower airfoil lift coefficient than the airfoil lift coefficient of the inboard end of the outboard wing portion. The variations in local airfoil lift coefficients required to obtain a substantially smooth transition in lift distribution may be obtained by a variety of techniques, including, for example, using different airfoil geometries along the span of the wing, configuring portions of the wing with some degree of twist and/or sweep, and/or using various lift altering devices known in the art.

Referring now to FIG. 5, a cross-sectional view of the inboard wing portion 32 and the engine 20 of FIG. 1 is illustrated. In particular, FIG. 5 illustrates how, in one embodiment of the present invention, the inboard wing portion 32 is equipped with a fowler flap 34. When the fowler flap 34 is actuated, the fowler flap 34 extends backwards and downwards and, thereby, increases the chord length and the camber of the wing in the region of the flap 34. As also illustrated in FIG. 5, the activation of the fowler flap 34 increases the shielded area 80 below the wing 30 by an additional area 81 below and rearward of the engine 20. In this way, the fowler flap can be used to tailor the local lift coefficient, the spanwise lift distribution, and the chord length of the inboard wing portions 32 and 52 for both performance reasons and/or noise-shielding regions. For example, the fowler flaps 34 and 54 can be extended during takeoff and climb so that the inboard wing portions 32 and 52, respectively, generate greater lift for climbing and so that the greater chord length of the inboard wing portions caused by the extension of the fowler flap increases the shielding of the engine noise when it is needed most, i.e., when the aircraft is flying low (i.e., close to surrounding communities) and slow with the engines generating a high level of thrust. In general, the flaps on the trailing edge of the inboard wing portions are configured to extend outward and/or downward during take-off and landing of the aircraft.

Other high-lift devices, chord-extending devices, and/or camber-changing devices may be used to adjust the aerodynamic properties of the inboard wing portions 32 and 52 while at the same time adjusting the engine noise-shielding properties of the wing. Such devices may include trailing edge devices, such as the fowler flap illustrated in FIG. 5 or multiple slotted flaps. Such devices may also include leading edge devices, such as slats or Krueger flaps. FIG. 6 illustrates an embodiment of the present invention where the inboard wing portion 32 is equipped with both a fowler flap 34 and a leading-edge slat 36. FIG. 6 also illustrates how the slat 36 and the fowler flap 34 may both work to increase the shielding of the inboard wing portion 32.

As described above, embodiments of the present invention are generally configured to shield surrounding communities from at least some of the engine noise by positioning the engines 20 and 22 in major part, if not entirely, over the longer-chord inboard wing portions 32 and 52. In other embodiments, however, where the engines 20 and 22 are not positioned entirely or even in major part over the longer-chord inboard wing portions 32 and 52, the aircraft may be configured such that the engines 20 and 22 are positioned entirely, or at least in major part, over the inboard wing portions 32 and 52 when any dynamic chord-extending devices, such as fowler flaps 34 and 54, are fully extended. In such an embodiment, the chord-extending devices may be activated to extend the chord of the inboard wing portions 32 and 52 whenever it is desirous to increase the engine noise shielding (e.g., during takeoff and landing maneuvers).

FIG. 1 illustrates how the fowler flaps 34 and 54 are located generally along a substantial portion of the inboard wing portion's trailing edge. The outboard wing portions 45 and 65 may also have various control devices such as flaps, slats, and spoilers. In the illustrated embodiment, the outboard wing portions 45 and 65 have ailerons 47 and 67 that extend along a substantial portion of the outboard wing portions' trailing edges 46 and 66. These ailerons can typically be deflected upwards and downwards in order to roll the aircraft about the longitudinal axis 11.

FIG. 7 illustrates an aircraft 701 configured in accordance with another exemplary embodiment of the present invention. In general, the aircraft 701 is configured similar to the aircraft 1 illustrated in FIG. 1. In this regard, the aircraft 701 has a generally tubular fuselage 710 with a nose 712 and a tail 714. Two main wings 730 and 750 extend from the fuselage 710 and are configured to provide most of the support for the aircraft 701 during flight. A vertical stabilizer 718 and a horizontal stabilizer 716 also extend from the fuselage 710, the horizontal stabilizer 716 being separate and distinct from the main wings 730 and 750. Like the aircraft 1 of FIG. 1, the aircraft's main wings 730 and 750 each have longer-chord inboard wing portions 732 and 752, as well as shorter-chord outboard wing portions 745 and 765. The aircraft 701 also has two engines 732 and 752 that are positioned at least in major part over the longer-chord inboard wing portions 732 and 752. In contrast to the aircraft 1 of FIG. 1, however, the aircraft 701 has a high-wing configuration. The high-wing configuration may have various benefits. One such benefit may be that the longer-chord wing portions 732 and 752 also function to shield at least a substantial portion of the fuselage 710 from the engines 720 and 722, thereby, resulting in a quieter ride for the passengers in the aircraft 701. The high-wing configuration, however, may also have some disadvantages depending on other aspects of the aircraft. For example, positioning the engines 720 and 722 over a high-wing may result in the engines being an undesirable distance above the aircraft's center of gravity. For embodiments of the present invention where the wings are positioned in a high-wing configuration, the engines 720 and 722 may be at least partially over the fuselage instead of fully or substantially over the inboard wing portions 732 and 752.

FIGS. 8 and 9 illustrate a top plan view and a front view, respectively, of an aircraft 801 configured in accordance with another embodiment of the invention. Like the aircraft 1 illustrated in FIGS. 1-3, the aircraft 801 has a generally tubular fuselage 810 with a nose 812 and a tail 814 and defining a longitudinal axis 811 therebetween. Two main wings 830 and 850 extend from the fuselage 810 and are configured to provide most of the support for the aircraft 801 during flight. A vertical stabilizer 818 and a horizontal stabilizer 816 also extend from the fuselage 810, the horizontal stabilizer 816 being separate and distinct from the main wings 830 and 850. Like the aircraft 1 of FIGS. 1-3, the aircraft's main wings 830 and 850 each have longer-chord inboard wing portions 832 and 852, as well as shorter-chord outboard wing portions 845 and 865. The longer-chord inboard wing portions 832 and 852 generally have an average chord length that is greater than the average chord length of the shorter-chord outboard wing portions 845 and 865, and the outboard ends of the inboard wing portions 832 and 852 generally have a chord length that is significantly greater than the inboard ends of the outboard wing portions 845 and 865. The aircraft 801 also has two engines 832 and 852 that are positioned at least in major part over the longer-chord inboard wing portions 832 and 852.

In contrast to the aircraft 1 of FIG. 1, however, the aircraft 801 has transition wing portions 870 and 890 extending from the outboard ends of the inboard wing portions 832 and 852 to the inboard ends of the outboard wing portions 845 and 865. In contrast to the sudden step-like transition in the wing geometry illustrated in FIGS. 1 and 3, the transition wing portions 870 and 890 provide for a more gradual change in the wing geometry between the inboard and outboard wing portions. In one embodiment, the transition wing portions 870 and 890 are configured such that they span an area of the wing that is less than the average chord length of the inboard wing portions 832 and 852. In other embodiments, the semispan of the transition wing portion 870 or 890 accounts for between 5% and 25% of the semispan of the wing 830 or 850. In still other embodiments, however, the transition wing portions 870 and 890 may be of any length. As illustrated in FIG. 8, in one embodiment, the inboard wing portion, the transition wing portion, and the outboard wing portion of each wing may each have different sweep angles. As also illustrated in FIG. 8, in one embodiment, the sweep angle of the transition and outboard wing portion leading edges are the same such that the change in the chord length in the planform of the wing occurs at the trailing edge of the transition wing portions 870 and 890. Other possible configurations of the three wing portions will be apparent to one of ordinary skill in the art in view of the present disclosure.

In some embodiments of the present invention, the aircraft 801 may have fences between the inboard wing portions 832 and 852 and the transition wing portions 870 and 890 and/or between the transition wing portions 870 and 890 and the outboard wing portions 845 and 865. These fences may be used to segregate the different flow regions and/or to provide barriers for engine noise extending outward along the wing span. In other embodiments, however, such as the embodiments illustrated in FIGS. 8 and 9, the fences may not be used. Like the inboard and outboard wing portions, the transition wing portions 870 and 890 may be equipped with various control surfaces, such as flaps, slats, ailerons, and the like, including, for example, chord-extending devices such as fowler flaps that may be extended to provide increased engine noise shielding.

FIG. 10 is a top plan view of an aircraft 901 similar to the aircraft 801 illustrated in FIGS. 8 and 9, but having smoother, more gradual transitions between the inboard wing portions 932 and 952, the transition wing portions 970 and 990, and the outboard wing portions 945 and 965, in accordance with an embodiment of the present invention.

FIG. 11 is a top plan view of an aircraft 1001 configured as described above with respect to the aircraft 1 illustrated in FIGS. 1-6, but having forward swept outboard wing portions 1045 and 1065 and two propeller (or turboprop, prop-fan, open-fan, un-ducted fan, open-rotor) engines 1020 and 1052 in a pusher configuration, in accordance with an embodiment of the present invention. As described above, the various wing portions described herein may have various degrees of positive or negative sweep or may have no sweep at all. As also described above, embodiments of the present invention may utilize different types of aircraft engines without departing from the spirit and scope of the invention. As further illustrated in FIG. 11, the embodiments of the aircraft described herein may be equipped with various other features well-known in the art, such as winglets 1096 and 1097, depending on the various design considerations of the particular embodiment.

FIG. 12 illustrates a side section view of a wing 1250 and engine 1222 showing a wing fence 1260 in accordance with an embodiment of the present invention. As described above with reference to FIGS. 1 and 3, the aircraft may be configured with a fence between one or more of the wing potions, such as the inboard wing portion, the outboard wing portion, and any transition wing portion. Such a fence may function to shield noise radiating downward and outward (e.g., along the wing) from the engine as well as to segregate the airflow over portions of the wing. As illustrated in FIG. 12, in some embodiments, the fence 1260 may only extend from an aft portion of the wing 1250 and may extend from the upper and lower surfaces of the wing 1250. For example, in one embodiment, the fence chord is between about 0.3 times the outboard wing chord and 0.7 times the inboard wing chord.

FIG. 13 illustrates a top plan view of an aircraft 1301 having a canard configuration in accordance with an embodiment of the present invention. As described above, embodiments of the present invention generally provide noise-shielding wing and engine configurations for aircraft having a wing and a horizontal stabilizer separate and distinct from the wing. As also described above, the horizontal stabilizer may take a variety of forms. For example, FIG. 13 illustrates the horizontal stabilizer 1316 in a canard configuration where the horizontal stabilizer 1316 extends from the fuselage 1310 at a location closer to the nose 1312 of the aircraft 1301 than the main wing 1330 and 1350. In the illustrated embodiment, the vertical stabilizer 1318 is located aft of the main wing 1330 and 1350 proximate the aircraft's tail 1314. The main wing 1330 and 1350 in the illustrated embodiment has a form similar to that of the main wing described above with reference to FIG. 10; however, in other embodiments the wing may have a form consistent with other embodiments of the invention described herein or equivalents thereof.

FIG. 14 illustrates a top plan view of an aircraft having a configuration in accordance with another embodiment of the present invention. In the illustrated embodiment, the first wing 1430 and the second wing 1450 each have a larger chord inboard wing portion 1432 and 1452 and a smaller chord outboard wing portion 1445 and 1465. In contrast to other embodiments illustrated herein, however, the aircraft has three fuselages 1410*a*, 1410*b*, and 1410*c*, where a fuselage 1410*b* or 1410*c* separates the inboard wing portions 1432 and 1452 from the outboard wing portions 1445 and 1465. The engines 1420 and 1422 are positioned over the inboard wing portions 1432 and 1452 each generally between the two of the fuselages. With such a configuration, the fuselages may function to shield the surrounding communities from noise radiating downward and outward from the engines 1420 and 1422.

In the embodiment illustrated in FIG. 14, the inboard wing portions 1432 and 1452 are forward swept and the outboard wing portions 1445 and 1465 are rearward swept. In other embodiments, all of the wing portions may be forward swept, rearward swept, or have no sweep. In still other embodiments, the inboard wing portions may be rearward swept and the outboard wing portions may be forward swept. In the illustrated embodiment, the center fuselage 1410*a* is set back from the other two fuselages 1410*b* and 1410*c* and has the horizontal and vertical stabilizers 1416 and 1418 extending therefrom. In other embodiments, the two outboard fuselages 1410*b* and 1410*c* may be set back from the center fuselage 1410*a* and the horizontal and vertical stabilizer may extend from the outboard fuselages 1410*b* and 1410*c*.

Specific embodiments of the invention are described herein. Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. An aircraft comprising:
    a generally tubular fuselage;
    a first wing and a second wing mounted to the generally tubular fuselage and configured for aerodynamically supporting the aircraft during flight, wherein the first and second wings each comprise at least two distinct wing portions including a shorter chord outboard wing portion and a longer chord inboard wing portion, wherein the shorter chord outboard wing portion has an average chord length that is less than the average chord length of the longer chord inboard wing portion, wherein the longer chord inboard wing portion has a minimum chord length that is greater than the maximum chord length of the shorter chord outboard wing portion, and wherein the first and second wings are configured such that the longer chord inboard wing portion is adjacent to the shorter chord outboard wing portion resulting in a planform step from the longer chord inboard wing portion to the shorter chord outboard wing portion in at least a portion of the wing;
    a horizontal stabilizer mounted to the generally tubular fuselage rearward of the first and second wings, the horizontal stabilizer being separate and distinct from the first and second wings;
    an engine; and
    an engine mounting system configured to attach the engine to the aircraft such that the engine is positioned in major part over the longer chord inboard wing portion of at least one of the first and second wings so that an area below the aircraft is at least partially shielded from the sound of the engine by the longer chord inboard wing portion.

2. The aircraft of claim 1, wherein the average lift coefficient of the inboard wing portion's airfoils at a cruise angle of attack is less than the average lift coefficient of the outboard wing portion's airfoils at said cruise angle of attack.

3. The aircraft of claim 1, wherein the wing lift coefficient of the inboard wing portion at a cruise angle of attack and with zero deflection of any moveable lift altering devices is less than the wing lift coefficient of the outboard wing portion at said cruise angle of attack and with zero deflection of any moveable lift altering devices.

4. The aircraft of claim 1, wherein the chord length of the airfoil at the outboard end of the inboard wing portion is greater than the chord length of the airfoil at the inboard end of the outboard wing portion, and wherein the lift coefficient of the airfoil at the outboard end of the inboard wing portion is less than the lift coefficient of the airfoil at the inboard end of the outboard wing portion.

5. The aircraft of claim 1, wherein there is a substantially smooth transition in lift distribution over the areas where the first and second wings transition between the inboard wing portions and the outboard wing portions.

6. The aircraft of claim 1, wherein the planform transition from the inboard wing portion to the outboard wing portion occurs over a spanwise distance less than the average chord of the inboard wing portion.

7. The aircraft of claim 1, wherein the first and second wings are configured such that there is an immediate transition between the inboard wing portion and the outboard wing portion resulting in a planform step from the inboard wing portion to the outboard wing portion in at least a portion of the wing.

8. The aircraft of claim 1, comprising a first engine and a second engine, wherein the first engine is positioned in major part over the inboard wing portion of the first wing, and wherein the second engine is positioned in major part over the inboard wing portion of the second wing.

9. The aircraft of claim 8, wherein the first and second engines are positioned entirely within the areas extending above the inboard wing portions of the first and second wings, respectively.

10. The aircraft of claim 1, further comprising a first fence extending from the first wing and a second fence extending from the second wing, the first fence positioned between the inboard wing portion and the outboard wing portion of the first wing, and the second fence positioned between the inboard wing portion and the outboard wing portion of the second wing, wherein the first and second fences are configured to segregate at least a portion of the airflow flowing around the outboard wing portion and the inboard wing portion of each wing during flight.

11. The aircraft of claim 1, further comprising a chord-extending device on each inboard wing portion of the first and second wings configured to extend the effective chord length of at least portions of the inboard wing portions.

12. The aircraft of claim 11, wherein the chord-extending devices comprise fowler flaps.

13. The aircraft of claim 11, comprising a first and second engine, wherein the first and second engines are positioned entirely within the area extending above the inboard wing portion of the first and second wings, respectively, when the chord-extending devices are fully extended.

14. The aircraft of claim 1, wherein the first and second wings are located in a low-wing or mid-wing configuration relative to the generally tubular fuselage.

15. The aircraft of claim 1, wherein the overall wing aspect ratio of the combined first and second wings is greater than or equal to eight, and wherein the effective aspect ratio of the outboard wing portions of the first and second wings is greater than eight.

16. The aircraft of claim 1, wherein the ratio of the average chord of the inboard wing portion to the average chord of the outboard wing portion is greater than or equal to three-halves.

17. The aircraft of claim 1, wherein the trailing edge of each of the first wing and the second wing, moves significantly aft from the trailing edge location of the inboard end of the outboard wing portion, to the trailing edge location of the outboard end of the inboard wing portion, and wherein the trailing edge moves significantly aft along a planform boundary that lies within 15 degrees of a streamwise direction.

18. A method of manufacturing an aircraft comprising:
providing a generally tubular fuselage;
mounting a first wing and a second wing to the generally tubular fuselage, the first and second wings configured for aerodynamically supporting the aircraft during flight, wherein the first and second wings each comprise at least two distinct wing portions including a shorter chord outboard wing portion and a longer chord inboard wing portion, wherein the shorter chord outboard wing portion has an average chord length that is less than the average chord length of the longer chord inboard wing portion, wherein the longer chord inboard wing portion has a minimum chord length that is greater than the maximum chord length of the shorter chord outboard wing portion, and wherein the first and second wings are configured such that the longer chord inboard wing portion is adjacent to the shorter chord outboard wing portion resulting in a planform step from the longer chord inboard wing portion to the shorter chord outboard wing portion in at least a portion of the wing;
mounting a horizontal stabilizer to the generally tubular fuselage rearward of the first and second wings, the horizontal stabilizer being separate and distinct from the first and second wings;
providing a first engine and a second engine; and
mounting the first engine and the second engine to the aircraft such that the first and second engines are each positioned in major part over the longer chord inboard wing portion of the first and second wings, respectively, so that an area below the aircraft is at least partially shielded from the sound of the first and second engines by the longer chord inboard wing portions.

19. The method of claim 18, further comprising:
providing fowler flaps on the longer chord inboard wing portions of the first and second wings; and
mounting the first and second engines over the inboard wing portions in the region of the fowler flaps.

20. The method of claim 18, further comprising:
forming the first and second wings such that the average lift coefficient of the airfoils that make up the inboard wing portions is less than the average lift coefficient of the airfoils that make up the outboard wing portions.

21. The method of claim 18, further comprising:
forming the first and second wings such that airfoil of the outboard end of the inboard wing portion has a lift coefficient that is less than the lift coefficient of the airfoil of the inboard end of the outboard wing portion such that there is a substantially smooth lift distribution curve over the transitions between the inboard wing portion and the outboard wing portion.

22. A method of shielding communities from engine noise generated by an engine of an aircraft, the aircraft comprising a wing for aerodynamically supporting the aircraft during flight and a horizontal stabilizer separate and distinct from the wing and mounted rearward of the wing, the method comprising:
providing at least two distinct wing portions including a shorter chord outboard wing portion and a longer chord inboard wing portion, wherein the shorter chord outboard wing portion has an average chord length that is less than the average chord length of the longer chord inboard wing portion, wherein the longer chord inboard wing portion has a minimum chord length that is greater than the maximum chord length of the shorter chord outboard wing portion, wherein the longer chord inboard wing portion is adjacent to the shorter chord outboard wing portion resulting in a planform step from the longer chord inboard wing portion to the shorter chord outboard wing portion in at least a portion of the wing, and wherein the engine is positioned in major part over the longer chord inboard wing portion of the wing so that an area below the aircraft is at least partially shielded from the sound of the engine by the longer chord inboard wing portion.

23. The method of claim 22, further comprising:
providing a chord-extending device in the leading edge or the trailing edge of the longer chord inboard wing portion proximate the spanwise location of the engine; and
extending the chord-extending device to shield a larger area below the aircraft from the sound of the engine.

* * * * *